United States Patent

[11] 3,590,467

[72] Inventors John R. Chase;
John A. Rimer, both of Bradford, Pa.

[21] Appl. No. 776,190
[22] Filed Nov. 15, 1968
[45] Patented July 6, 1971

[73] Assignee Corning Glass Works
Corning, N.Y.

[54] METHOD FOR BONDING A CRYSTAL TO A SOLID DELAY MEDIUM
12 Claims, 1 Drawing Fig.

[52] U.S. Cl. .......... 29/472.7, 29/473.1, 29/502, 29/504
[51] Int. Cl. .......... B23k 31/02
[50] Field of Search .......... 29/472.7, 473.1, 502, 504

[56] References Cited

UNITED STATES PATENTS

| | | | |
|---|---|---|---|
| 2,709,147 | 5/1955 | Ziegler | 29/472.7 X |
| 2,754,238 | 7/1956 | Arenberg | 29/473.1 X |
| 3,042,550 | 7/1962 | Allen et al. | 29/473.1 X |
| 3,131,459 | 5/1964 | Allen | 29/472.7 X |
| 3,131,460 | 5/1964 | Allen | 29/472.7 |
| 3,235,943 | 2/1966 | Marafioti | 29/473.1 X |
| 3,246,384 | 4/1966 | Vice | 29/502 X |
| 3,252,722 | 5/1966 | Allen | 29/472.7 X |

FOREIGN PATENTS

| | | | |
|---|---|---|---|
| 800,519 | 8/1958 | Great Britain | 29/472.7 |
| 930,352 | 7/1963 | Great Britain | 29/502 |

OTHER REFERENCES

Richard B. Belser, " A Technique of Soldering to Thin Metal Films," THE REVIEW OF SCIENTIFIC INSTRUMENTS, Vol. 25, No. 2, pp. 180—183, Feb. 1954.

*Primary Examiner*—John F. Campbell
*Assistant Examiner*—Ronald J. Shore
*Attorneys*—Clarence R. Patty, Jr. and Walter S. Zebrowski

ABSTRACT: A method by which metallic base layers are first deposited on the mating surfaces of a crystal and delay medium which layers are suitable for bonding with indium. Thereafter, a layer of indium is deposited on at least one of the mating surfaces in a substantially nonoxidizing environment. The mating surfaces are then pressed together at a pressure of at least 90 p.s.i. while the indium is heated to a molten state and maintained in such a condition for at least 15 seconds. Thereafter, the temperature of the indium is reduced below its melting point to solidify the indium and form the bond.

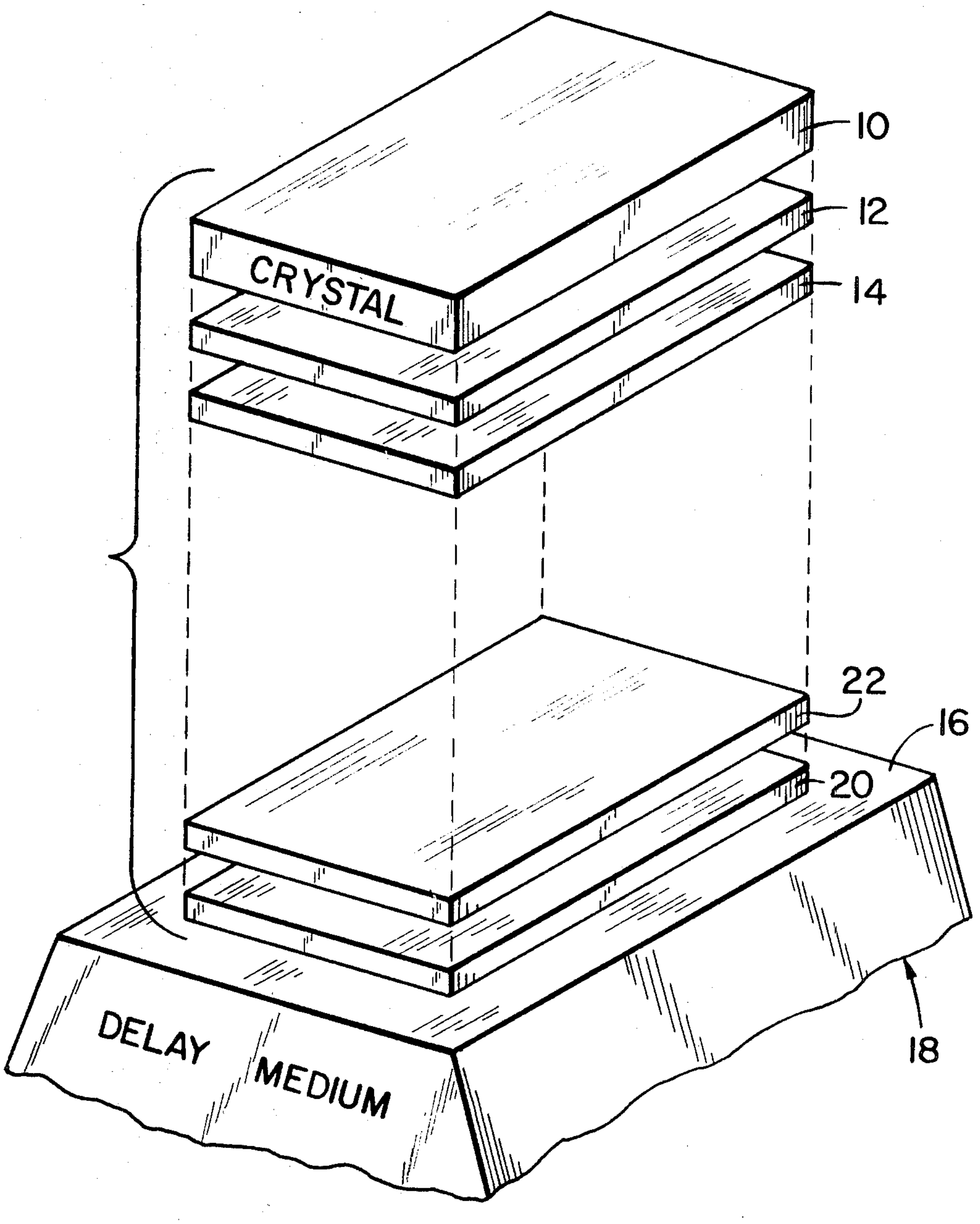
INVENTORS.
John R. Chase
John A. Rimer
BY
Walter S. Zebrowski
ATTORNEY

METHOD FOR BONDING A CRYSTAL TO A SOLID DELAY MEDIUM

BACKGROUND OF THE INVENTION

Heretofore many attempts have been made toward solving the problem of forming a mechanically strong low loss bond between a piezoelectric crystal transducer and a solid delay line medium. A delay line is commonly used to retard the propagation of electrical signals between two points in an electrical circuit. A ceramic or quartz crystal is employed as an input transducer to convert incoming electrical signal energy to acoustical vibrations or mechanical energy. Thereafter, the mechanical energy is coupled from the transducer to an input facet of a solid delay medium through a thin mechanical bond therebetween. The mechanical energy coupled to the delay medium thereafter travels the length of a prescribed path within the medium at a relatively slow velocity of propagation compared with the velocity of propagation of electrical energy through an electrical conductor. At the other end of the prescribed path the mechanical energy is coupled through another mechanical bond to a second crystal transducer where it is converted back into electrical signal energy.

It is of paramount importance in most delay line applications that the energy conversions and signal transmission occurring in the line be effected without appreciable attenuation of the desired signal, or generation of spurious signals which often manifest themselves as noise in the main electrical signal channel. A major source of noise and main signal attenuation in delay lines can occur at the boundary or interface of the transducer and the delay medium in the mechanical bond. Two basic methods have commonly been employed in the prior art to form such bonds.

One such method is commonly referred to as the "hot solder" bonding method and is exemplified by U.S. Pat. No. 2,964,839, issued to J. J. Marafioti. As this patent teaches, preparatory to forming a bond between a silica delay medium and a quartz crystal, a mating surface of the silica is metallized by firing a platinum film thereon, and a mating surface of the quartz is metallized by firing a gold-platinum alloy film thereon. Next, a puddle of molten indium is formed on each film in a complicated manually manipulated process wherein the quartz and silica mating surfaces are each heated to about 250° C., a temperature well in excess of the melting point of indium, after which pure indium taken from an auxiliary molten indium puddle is swabbed onto the mating surfaces with a vibrating fiber glass brush. The indium is slowly and carefully spread over these surfaces in this manner for a period of time ranging from 1 to 10 minutes so as to allow the indium time to diffuse through the platinum and platinum-gold films. During this time, however, the molten indium tends to form an oxide surface skin rapidly, which skin must be repeatedly removed by scraping the mating surfaces with a taunt silica fiber. Because large quantities of the indium puddle oxidize so rapidly and must be scraped away, the puddle must be continually replenished with indium to maintain a sufficient supply of pure indium on the mating surfaces to complete the diffusion process. Upon completion of the indium diffusion process, a process attendant must quickly reduce the temperature of the mating surfaces and immediately bring them into intimate contact under pressure so as to form the bond as the indium solidifies. A delay in reducing the temperature and joining the mating surfaces can and usually does result in the formation of large quantities of oxide which mechanically weakens and substantially increases the loss characteristics of the bond.

Although this method can produce a satisfactory bond between the transducer and delay medium in the relatively short time of from 1 to 10 minutes, a great deal of skill and attention to detail on the part of the process attendant is required. Further, because of the manual manipulations required, this method is not adaptable to fully automatic machine processing.

The other bonding method is commonly termed, the "cold diffusion" method and is characterized by U.S. Pat. No. 3,131,460, issued to R. E. Allen. This method also involves the use of indium, however, the indium is deposited by vacuum evaporation onto a mating surface of a delay medium having successively deposited base coatings of aluminum and nickel-chromium alloy thereon. The mating surface of the crystal is provided with successive base coatings of either nickel and gold, or aluminum, nickel and gold. By depositing the indium by a vacuum evaporation technique, the Allen method avoids the problem of rapid indium oxide formation during deposition. After the indium layer is formed, the mating surfaces of the crystal and delay medium are brought into contact under mechanical pressure in a vacuum and the layers therebetween are elevated to a temperature of from 125° C. to 150° C. Unlike in the previously discussed "hot solder" method, the temperature in the subject bonding method is not permitted to reach the melting point of the indium, consequently the indium being of low mobility, takes a great length of time to diffuse into the adjacent layers to form the desired bond. During the period of time that diffusion takes place the pressure is maintained. The minimum time required in order to effect the bond ranges from 12 to 16 hours in duration.

Because the indium never becomes molten in the "cold diffusion" method, the formation of indium oxide is greatly retarded, even when the bond is formed in air, in comparison to its rate of formation in the "hot solder" method. Though the bond formed in this latter method is also satisfactory, an obvious disadvantage of the method is the extremely long time required in order to complete it.

SUMMARY OF THE INVENTION

In accordance with the foregoing it is an object of the instant invention to provide a method for bonding quartz or ceramic crystalline material to a solid delay medium which can be effected in a short time without resulting in the formation of appreciable quantities of bond degrading oxides.

It is a further object of the instant invention to provide a method for bonding a crystal transducer to a solid delay medium which is readily adaptable to automatic machine processing.

Briefly, in accordance with the instant invention, a method is provided for bonding a crystal to a delay medium wherein metallic base materials are successively deposited on the mating surfaces of a delay medium and a crystal, and a layer of indium is thereafter formed on at least one mating surface in a substantially nonoxidizing environment. The method includes pressing the mating surfaces together with the base and indium layers therebetween at a pressure of at least 90 p.s.i. While under pressure the indium layer is heated to a molten state and maintained in this condition for a time of at least 15 seconds. After this time the temperature of the indium is reduced to below its melting point while the pressure is maintained in order to form the bond.

The pressure across the crystal and the medium may then be removed and the resulting assembly permitted to cool to room temperature. The pressing step may be carried out in a substantially nonoxidizing atmosphere or may be performed in air.

Additional objects, features and advantages of the instant invention will become apparent to those skilled in the art from the following detailed description and attached drawing on which, by way of example, only the preferred embodiment of the instant invention is illustrated.

BRIEF DESCRIPTION OF THE DRAWINGS

The single FIGURE shows an exploded oblique view of a piezoelectric crystal with its respective metal coatings arranged for mating with a coated facet of a solid delay medium.

DESCRIPTION OF THE PREFERRED EMBODIMENTS

Referring to the drawing there is shown a piezoelectric crystal 10, which may be composed of any well-known ceramic, quartz, or the like piezoelectric materials, having successive coatings of nickel-chromium alloy 12 and gold 14 on a mating surface thereof. The alloy 12 is, in accordance with the instant example, preferably composed of about 80 percent nickel and 20 percent chromium although the composition proportions are not critical to the success of the invention. Those skilled in the art will recognize that a layer of chromium applied to the crystal 10, followed by a layer of nickel applied to the chromium can be satisfactorily substituted for the alloy 12 in order to form a crystal foundation or base coating for the crystal-to-delay medium bond. Other materials which can be used for crystal foundation coatings in the method of the instant invention are described subsequently. The alloy 12 may be applied to the crystal 10 by any well known method such as vacuum deposition, sputtering, or the like. One highly suitable method is vacuum deposition wherein the crystal 10 is placed in a vacuum chamber and a layer of chromium is first applied thereto. During the latter part of the chromium deposition period, a nickel deposition process is started so that for a time both nickel and chromium are simultaneously being deposited. After such time, depending on the combination proportions desired, the chromium deposition process is stopped, and the nickel deposition process is allowed to continue until the desired nickel thickness over the chromium-nickel region is obtained. In this manner a highly satisfactory pair of gradient subcoatings can be obtained in which the chromium rich material next to the surface of the crystal 10 adheres to the latter, whereas the nickel rich material at the top of the coating 12 is available for bonding to subsequently applied materials. The nickel-chromium transition region near the middle of the alloy 12 provides an excellent bond between the two constituents thereof.

Next, a layer of gold 14 is deposited by any suitable well-known method, which layer 14 among other important functions serves to protect the nickel rich region of the alloy 12 from oxidizing prior to the formation of the bond. It is preferred that both the layers 12 and 14 be deposited in a substantially nonoxidizing environment such as an inert gas, vacuum, or the like to prevent the formation of appreciable quantities of bond degrading oxides in the process.

Independent of the formation of the base coating of the crystal 10, a series of metal base coatings is successively deposited on a facet 16 of a suitable delay medium 18. The medium 18 preferably consists of a glass having a low or zero temperature coefficient of time delay such, for example, as that taught by U.S. Pat. No. 3,154,425 by H. L. Hoover and M. E. Nordberg. Other suitable delay medium materials include fused silica, glass, and glass ceramic. First, a nickel-chromium base layer 20 is deposited on the facet 16, followed by a layer 22 of indium. As in the case of depositing the layers 12 and 14 on the crystal 10, the layers 20 and 22 may be deposited by vacuum evaporation or other suitable methods. However, whereas the layer 20 can be deposited in any suitable environment, it is essential to the success of the instant invention that the indium layer 22 be deposited in a substantially nonoxidizing environment. Suitable and well-known methods for depositing the indium layer 22 include electron beam evaporation, sputtering, vacuum evaporation, and the like, all of which can be carried out in either a low pressure air environment of about 1 micron of hg. or less, or a low pressure environment containing an inert gas such as helium.

The indium layer 22 serves as the principal bonding medium between the crystal 10 and the delay facet 16 and should therefore be deposited in sufficient quantity and thickness to insure its diffusion into the gold layer 14 and nickel rich region of the layer 20 during the subsequently described steps of the method. The indium layer 22 is preferably deposited to a thickness of about 5,000 A., however, a thickness as low as about 1,000 A. is satisfactory. Any excessive amount of indium deposited will simply be squeezed out of the bond being formed during the subsequent step of compressing the crystal 10 against the facet 16.

The crystal 10 and delay medium 18 are now ready for mating, which mating consists of placing the gold layer 14 of the crystal 10 in intimate contact with the indium layer 22 on the facet 16. If prior to this, however, the indium layer 22 has been exposed to air for an appreciable length of time, it may be desirable to burnish the surface thereof by lightly rubbing it with a clean nylon cloth wrapped about a finger in order to remove any oxides and surface impurities that may be present.

The crystal 10 and facet 16 are pressed together with the various layers therebetween preferably at a pressure of 120 p.s.i., although any pressure of at least 90 p.s.i. is suitable so long as the pressure employed is insufficient to crack or damage the crystal 10 thereby destroying its piezoelectric properties. The assembly so formed is maintained in this condition while the joint between the crystal 10 and facet 16 is heated to a temperature at least equal to the melting point of the indium layer 22. A temperature of at least 156° C. will be required although higher temperatures up to the temperature at which the crystal 10 may undergo thermal shock, may be employed. The upper temperature limit is also determined by the temperature at which the particular crystal loses its polarization. For example, well-known crystal compositions include ceramics such a lead-zirconate-titanate crystals, commonly called PZT, and lead-zirconium-niobate crystals, called PSN, as well as quartz. The maximum temperatures to which these crystals can be exposed safely are as follows: PZT, 300° C.; PSN, 160° C.; and quartz, 590° C. Thus, the type of crystal being bonded will determine the maximum temperature to which the indium can be heated. In general, the higher the temperature to which the indium layer 22 is heated, the more rapid will be the formation of a satisfactory bond at a given pressure. However, where the pressing operation is performed in air, temperatures well above the melting point of indium may result in the formation of some bond degrading indium oxide. We have found that by utilizing bonding pressures of between 90 p.s.i. and 400 p.s.i. and bonding temperatures between 156° C. and 270° C., satisfactory bonds can be obtained by maintaining such temperatures for as short a time as 15 seconds, and for as long a time as about 30 minutes. It is preferred, however, to use a bonding pressure of 120 p.s.i. and a bonding temperature of 175° C., which temperature is maintained for a period of 1 minute. These conditions permit the rapid formation of a high mechanical strength, low energy loss bond. At the end of the heating period the heat is removed while the pressure is maintained in order to allow the layer 22 to cool below its melting point, at which point the indium solidifies and the pressure can then be removed.

It should be noted that where the pressing operation is carried out in air, it is important that the bonding pressure be applied over the entire period of time that the indium is in a molten state. This insures that the oxidation of the molten indium will be minimized. Of course, where the pressing operation is to be carried out in a vacuum chamber following the deposition of indium therein, the problem of oxidation is eliminated provided the vacuum in the chamber has been maintained continuously from the time of depositing the indium to the completion of the bond. Also, the necessity of burnishing the surface of the indium, prior to pressing and heating the mating surfaces, would be eliminated where the vacuum in the chamber has been maintained between the conclusion of the indium deposition and the beginning of the pressing operation.

Although the drawing has been described with a single indium layer applied to layer 20, it is also contemplated that the indium may be applied as a single layer to layer 14 on the crystal or as a pair of layers, one on the layer 14 and the other on the layer 20, and the components thereafter assembled as heretofore described.

As is well known in the prior art, aluminum adheres quite readily to both ceramic and quartz crystals, and to delay mediums consisting of fused silica, glass and ceramic. As a result successive coatings of aluminum, nickel and gold have been applied to such crystals, and aluminum, nickel, and indium have been applied to the facet of such delay mediums in the prior art in the order named. Thereafter, the crystal and medium have been pressed together under pressure at temperatures below the melting point of indium to form an excellent bond by the cold diffusion process. However, because such low temperatures were utilized, the time required to diffuse the indium properly to form the desired bond ranged from 12 up to 16 hours in duration.

Our method can be employed with respect to the materials comprising the above-mentioned structure to form the desired bond much more rapidly since we bring the crystal into intimate contact with the delay medium and then heat the indium therebetween to a molten state. After the molten state is reached we have found that the bond can be formed so quickly that the indium does not have time to oxidize to a harmful extent. This result is obtained because by bringing the indium to a temperature above its melting point, the indium is rendered highly mobile such that the necessary diffusion process takes only a matter of several minutes at most. This length of time while the assembly is under pressure is not sufficiently long to allow harmfully large quantities of indium oxide to form. Consequently, our method can be used to effect a bond between these materials in a matter of minutes, which bond compares favorably with a cold diffusion bond formed with the same materials in a process that takes many hours to execute.

Where fused silica delay mediums are employed, noble metals such as platinum have been used in prior art processes as the base coating because of its tendency to adhere tenaciously to the surface thereof. The platinum base coating also has properties which permit it to adhere well to indium which is deposited thereover. Further, an alloy of gold and platinum has been used in the prior art as a base coating for crystals consisting of both glass and ceramic. Successive layers of gold-platinum alloy and indium formed on the crystal with successive layers of platinum and indium formed on the delay medium have been used to form bonds by the well-known hot solder method. In that method of bonding, however, oxidation of the indium layer has been a severe disadvantage because the indium was applied in a molten state in the form of puddles before the step of assembling the components. As a result oxides of indium formed rapidly requiring that a process operator manually remove the oxide by scraping it away while replacing the indium in the puddles until the diffusion of the indium was sufficiently complete to cause it to adhere to the underlying layers. Even with the scraping away of the oxide an appreciable amount of oxide remained in the indium to weaken the bond. During the pressing operation which would thereafter be executed rather quickly, the molten indium within the bond continued to oxidize to further weaken the resulting bond and degrade the acoustical transmission properties thereof.

By our method as applied to the materials formerly employed in the hot solder method, molten indium is not puddled onto the base coatings on the crystal and delay medium, but is deposited thereon in a substantially nonoxidizing atmosphere. Thus, little or no oxidation occurs during the deposition process. Thereafter, while heating the indium to the molten state the layers are under compression for only a short time, which time is the only period during which rapid oxidation of the indium can occur. If, however, the indium is compressed within a low pressure or nonoxidizing environment as previously suggested, there is virtually no chance for oxidation of the indium to occur. In no case, however, would our method require that a process attendant manually remove oxidation products from molten indium surfaces by scraping a silica fiber thereover or the like, nor would it be necessary to replace indium which has been oxidized and scraped away as is required in the hot solder method.

Although the instant invention has been described with respect to specific details of certain embodiments thereof it is not intended that such details limit the scope of the instant invention except insofar as set forth in the following claims.

We claim:

1. A method for forming a bond between a crystal and a solid delay medium, the steps of which comprise:
   depositing metallic base layers on the mating surfaces of said crystal and delay medium, said layers being bondable to indium, thereafter
   depositing a layer of indium on at least one of said mating surfaces in a substantially nonoxidizing environment,
   pressing said surfaces together at a pressure of at least 90 p.s.i.,
   heating said layer of indium to a temperature which is at least equal to the melting point thereof while said surfaces are under said pressure,
   maintaining said temperature for at least 15 seconds, and thereafter
   reducing said temperature below said melting point while said surfaces are under said pressure, whereby said indium solidifies to form said bond.

2. The method according to claim 1 wherein said base layers consist essentially of a nickel-chromium alloy and gold deposited on said crystal in the order named, and a nickel-chromium alloy deposited on said medium.

3. The method according to claim 1 wherein said base layers consist essentially of aluminum, nickel and gold deposited on said crystal in the order named, and aluminum and nickel deposited on said medium in the order named.

4. The method according to claim 1 wherein said base layers consist essentially of a platinum-gold alloy deposited on said crystal and platinum deposited on said medium.

5. The method according to claim 1 wherein said layer of indium is deposited by the process of vacuum evaporation.

6. The method according to claim 1 wherein said temperature is at least 156° C.

7. The method according to claim 1 wherein the step of pressing said surfaces together is carried out in air, said pressure being maintained so long as said indium is at said temperature.

8. The method according to claim 7 further comprising the step of burnishing the surface of said layer of indium prior to the step of pressing said surfaces.

9. The method of claim 1 wherein said crystal is quartz, said temperature to which said layer of indium is heated being between 156° C. and 590° C.

10. The method of claim 1 wherein said crystal is a ceramic consisting essentially of lead-zirconate-titanate, said temperature to which said layer of indium is heated being between 156° C. and 300° C.

11. The method of claim 1 wherein said crystal is a ceramic consisting essentially of lead-zirconium-niobate, said temperature to which said layer of indium is heated being between 156° C. and 160° C.

12. A method for forming a bond between a crystal selected from the group consisting of quartz and ceramic, and a solid delay medium selected from the group consisting of fused silica, glass and ceramic, the steps of which comprise:
   depositing a first base layer of nickel-chromium alloy on a mating surface of said crystal,
   depositing a layer of gold on said first base layer,
   depositing a second base layer of nickel-chromium alloy on a mating surface of said delay medium,
   depositing a layer of indium on said second base layer in a substantially nonoxidizing environment,
   pressing said surfaces together at a pressure of at least 90 p.s.i.,
   heating said layer of indium to a temperature of at least 156° C. while said surfaces are under said pressure,
   maintaining said temperature for between 15 seconds and 30 minutes,
   reducing said temperature below 156° C. while said surfaces are under said pressure, whereby said indium solidifies to form said bond, and thereafter
   removing said pressure.